United States Patent
Brown et al.

(10) Patent No.: US 7,142,100 B2
(45) Date of Patent: Nov. 28, 2006

(54) WHEEL POSITION INDICATOR

(75) Inventors: Gregory P. Brown, Dearborn, MI (US); Jeffrey S. Kapteyn, Grand Rapids, MI (US); Marcus Turner, Coventry (GB); Ian Hulme, Leamington Spa (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/694,258

(22) Filed: Oct. 27, 2003

(65) Prior Publication Data

US 2005/0087121 A1    Apr. 28, 2005

(51) Int. Cl.
*B60Q 1/00* (2006.01)

(52) U.S. Cl. ............ 340/438; 340/686.1; 340/686.3; 701/82; 701/41

(58) Field of Classification Search ......... 340/438, 340/686.1, 686.3; 701/70–72, 82, 41
See application file for complete search history.

(56) References Cited

U.S. PATENT DOCUMENTS

| | | | |
|---|---|---|---|
| 3,556,045 A | | 1/1971 | Williams |
| 4,860,457 A | * | 8/1989 | Beissbarth ............ 33/203.18 |
| 5,203,420 A | * | 4/1993 | Shiraishi ............... 180/400 |
| 5,742,918 A | * | 4/1998 | Ashrafi et al. ........... 701/70 |
| 6,089,344 A | | 7/2000 | Baughn et al. |
| 6,352,318 B1 | * | 3/2002 | Hosomi et al. .......... 303/139 |

* cited by examiner

*Primary Examiner*—Julie Bichngoc Lieu
(74) *Attorney, Agent, or Firm*—Fredrick Owens

(57) ABSTRACT

A wheel position indication system for a vehicle comprising a steerable wheel, a wheel position indicator and a controller. The wheel position indicator has an on state and an off state. The wheel position indicator provides a visual indication of the position of the steerable wheel when the wheel position indicator is in the on state. The wheel position indicator does not provide a visual indication of the position of the steerable wheel when the wheel position indicator is in the off state. The controller selectively alters the wheel position indicator between the on state and the off state. The controller places the wheel position indicator into the on state when the vehicle is in a predetermined driving condition and places the wheel position indicator into the off state when the vehicle is not in the predetermined driving condition.

28 Claims, 4 Drawing Sheets

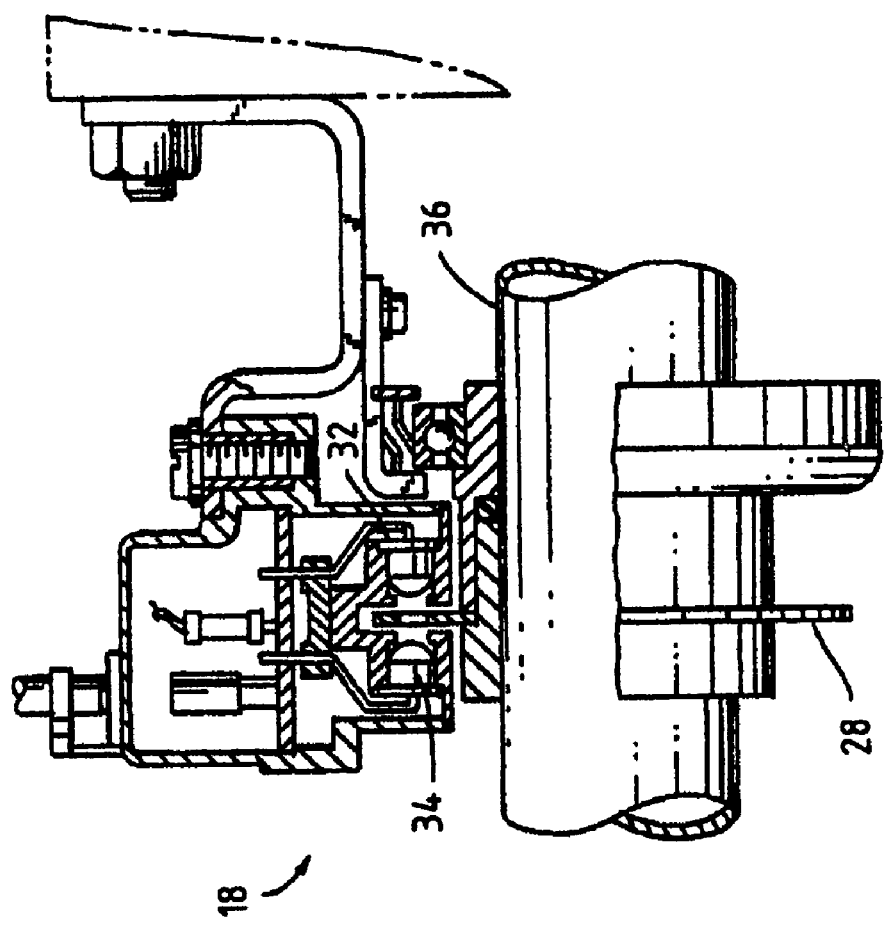
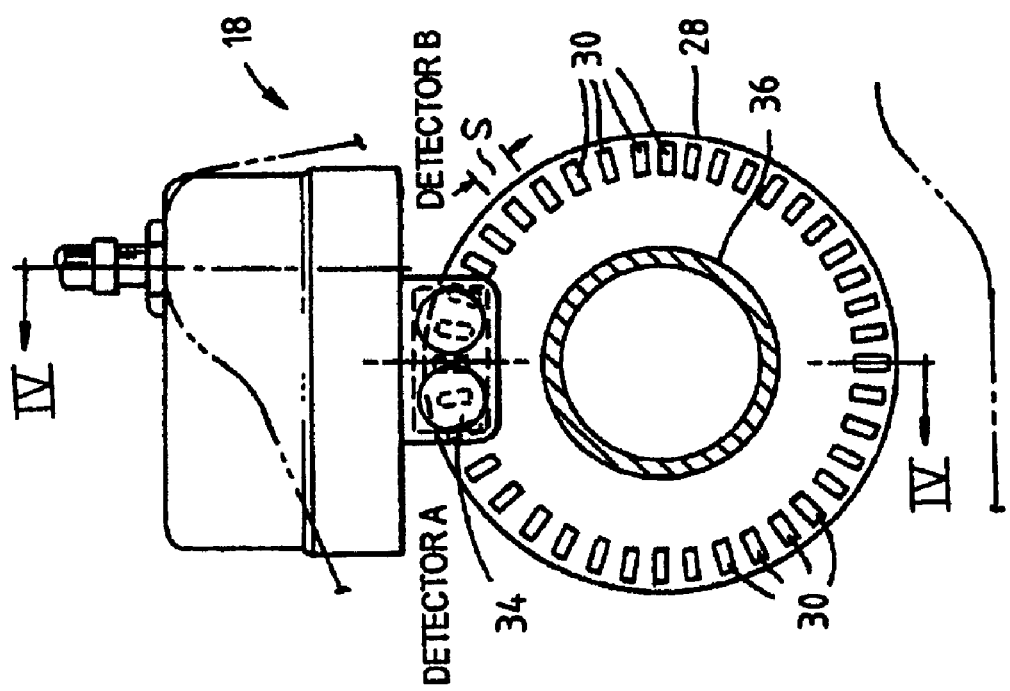
FIG. 4
FIG. 3

WHEEL POSITION INDICATOR

BACKGROUND OF THE INVENTION

The present invention relates to an indicator, and in particular to a wheel position indicator for a motor vehicle.

When driving off road, on a slippery surface, in a deep rut, etc., the driver of the motor vehicle may have turned the front wheels of the vehicle in a direction different than the direction of travel of the vehicle. For example, the front wheels may experience wheel slip if the driver is driving on a slippery surface or may be in a rut that forces the vehicle to travel along the length of the rut. However, when the road friction of the road surface increases or the depth of the rut is reduced, the vehicle may rapidly yaw when the vehicle begins to follow the direction of the wheels. In some situations, the driver of the vehicle may not know the direction of the wheels and may be unprepared for the rapid yaw of the vehicle when the vehicle leaves the slippery surface or the deep rut. Accordingly, an apparatus for notifying the driver of the angle of the front wheels is desired.

SUMMARY OF THE INVENTION

One aspect of the present invention is to provide a method of indicating a position of a steerable wheel of a vehicle which comprises providing a wheel position indicator having an on state and an off state. The wheel position indicator provides a visual indication of the position of the steerable wheel when the wheel position indicator is in the on state, but does not provide a visual indication of the position of the steerable wheel when the wheel position indicator is in the off state. The method further includes placing the wheel position indicator into the on state when the vehicle is in a predetermined driving condition and placing the wheel position indicator into the off state when the vehicle is not in the predetermined driving condition.

Another aspect of the present invention is to provide a wheel position indication system for a vehicle. The wheel position indication system includes a steerable wheel, a wheel position indicator and a controller. The wheel position indicator has an on state and an off state. The wheel position indicator provides a visual indication of the position of the steerable wheel when the wheel position indicator is in the on state. The wheel position indicator does not provide a visual indication of the position of the steerable wheel when the wheel position indicator is in the off state. The controller selectively alters the wheel position indicator between the on state and the off state. The controller places the wheel position indicator into the on state when the vehicle is in an off road condition and places the wheel position indicator into the off state when the vehicle is not in the off road condition.

Yet another aspect of the present invention is to provide a wheel position indication system for a vehicle comprising a steerable wheel, a wheel position indicator and a controller. The wheel position indicator has an on state and an off state. The wheel position indicator provides a visual indication of the position of the steerable wheel when the wheel position indicator is in the on state. The wheel position indicator does not provide a visual indication of the position of the steerable wheel when the wheel position indicator is in the off state. The controller selectively alters the wheel position indicator between the on state and the off state. The controller places the wheel position indicator into the on state when the steerable wheel has a slip angle above or equal to a predetermined amount and places the wheel position indicator into the off state when the steerable wheel has a slip angle below the predetermined amount.

Accordingly, the wheel position indicator will indicate the position of the steerable wheel to notify the driver of the vehicle that the steerable wheel may not be in the position contemplated by the driver. The driver will then be able to respond adequately when the steerable wheel reacts according its proper direction of travel. The wheel position indicator is easy to implement, capable of a long operable life, and particularly adapted for the proposed use.

These and other features, advantages, and objects of the present invention will be further understood and appreciated by those skilled in the art by reference to the following specification, claims and appended drawings.

BRIEF DESCRIPTION OF THE DRAWINGS

FIG. 3 is a plan view, partially cut away, of a steering sensor comprising a component part of a wheel indication system of the present invention.

FIG. 4 is a cross sectional view of the steering sensor of the present invention taken along the line 4—4 of FIG. 3.

DETAILED DESCRIPTION OF THE PREFERRED EMBODIMENTS

For purposes of description herein, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
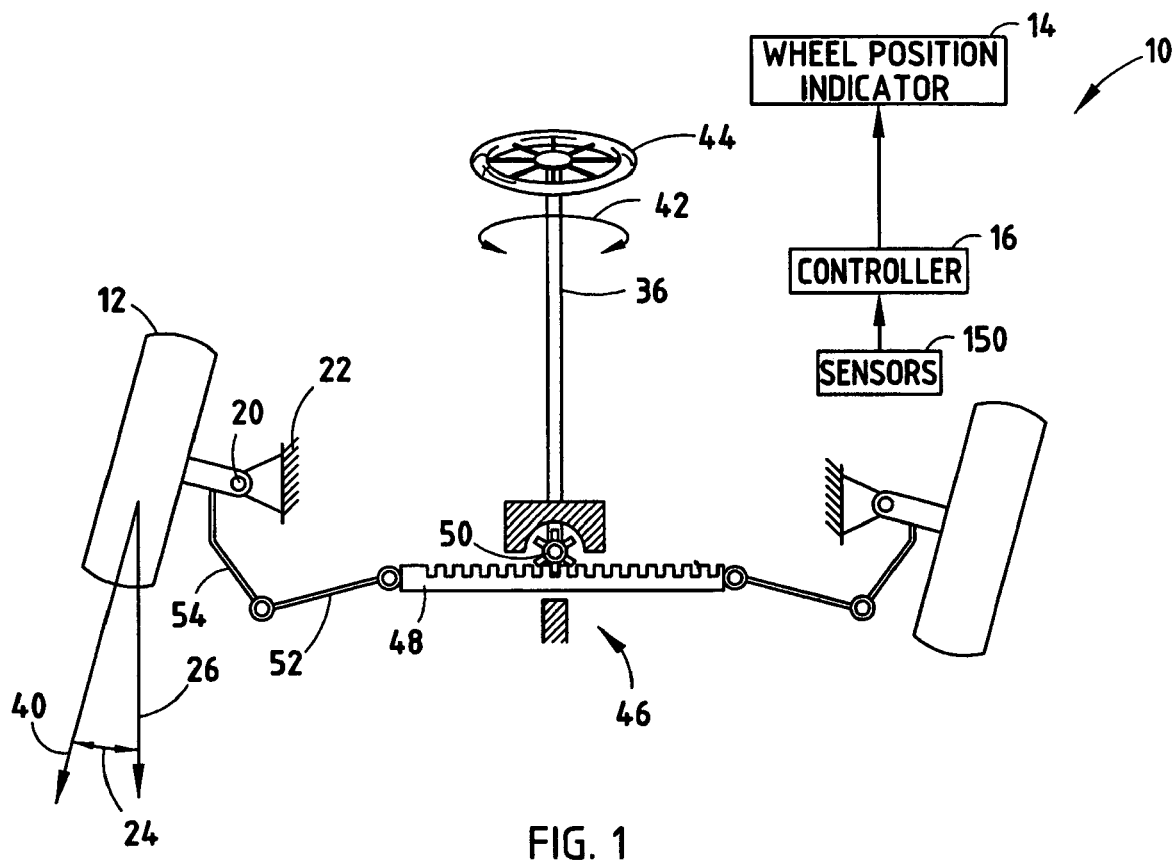
FIG. 1 is a schematic view of a vehicle embodying the present invention.

Referring to FIG. 1, reference number 10 generally designates a vehicle embodying the present invention. The vehicle 10 includes a wheel position indication system for indicating a position of a steerable wheel 12 of the vehicle 10. The vehicle comprises the steerable wheel 12, a wheel position indicator 14 and a controller 16. The wheel position indicator 14 has an on state and an off state. The wheel position indicator 14 provides a visual indication of the position of the steerable wheel 12 when the wheel position indicator 14 is in the on state. The wheel position indicator 14 does not provide a visual indication of the position of the steerable wheel 12 when the wheel position indicator 14 is in the off state. The controller 16 selectively alters the wheel position indicator 14 between the on state and the off state. The controller 16 places the wheel position indicator 14 into the on state when the vehicle 10 is in a predetermined driving condition and places the wheel position indicator 14 into the off state when the vehicle 10 is not in the predetermined driving condition.

In the illustrated example, the vehicle 10 includes a pair of the steerable wheels 12 that pivot about a pivot point 20 with respect to a vehicle frame 22. Each wheel 12 defines a steering angle 24 between a longitudinal axis 26 of the vehicle and a central travel axis 40 of each wheel 12. It should be noted that while the steering angle 24 is defined by the pivotal movement of each of steerable wheels 12, the steering angle 24 may be defined by pivotable rear wheels if the vehicle is so equipped, and/or any other pivotable wheels.

The illustrated vehicle 10 also includes a steering column 36 rotatable in a direction represented by an arrow 42, and operable to receive a driver input control angle from an operator of the vehicle 10 via a steering wheel 44. The steering column 36 is operably linked to the steerable wheels 12 via a rack-and-pinion system 46 that includes a rack 48 and a pinion gear 50, a pair of drag links 52, and a steering arm 54. Although the present example utilizes a rack-and-pinion steering system, it should be noted that other steering systems compatible with the vehicle 10 described herein may be utilized.

Figure 2:
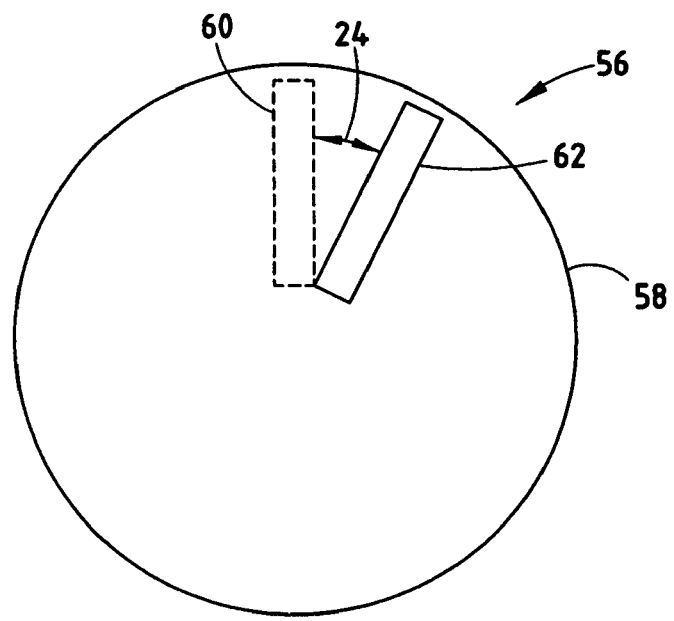
FIG. 2 is a schematic view of a digital visual indicator representing a visual indication of a steerable wheel of the vehicle.

In the present invention, the visual indication of the position of the steerable wheel could be an analog or digital visual indicator in the dashboard of the vehicle 10. The visual indicator that represents the position of the steerable wheel could be by way of a continuous scale, discrete settings or a left/right indicator. Discrete settings, together with a low pass filter, may be preferred when the vehicle experiences many oscillations such that the indicator provides a steady output. FIG. 2 illustrates a digital visual indicator 56 including a circle 58 with a plurality of digital lines displaying the central travel axis 40 of each wheel 12, with a vertical line 60 (shown in phantom) at the top of the circle (i.e., twelve o'clock position) representing the central travel axis 40 being parallel with the longitudinal axis 26 of the vehicle 10. In the illustrated example, the steerable wheel 12 is displayed as a line 62 positioned relative to the vertical line 62 approximately equal to the position of steering angle 24 relative to the longitudinal axis 26 of the vehicle. It is contemplated that the digital display indicator could include a left/right indicator or a numerical value, with positive numbers representing the degrees that the wheel 12 is turned to the right and negative numbers representing the degrees that the wheel 12 is turned to the left (or vice versa). Those skilled in the art will appreciate other digital means of representing the position of the steerable wheel 12.

When the digital visual indicator 56 is used in the wheel position indicator system, the steering position indicated can use a steering sensor to determine the position of the steerable wheel 12. In a preferred embodiment as illustrated in FIGS. 3–6, the steering sensor 18 includes means for measuring the absolute steering position, which represents the angular excursion of the steerable wheel from a center position, which is determined by the steering sensor in conjunction with the control module and means. As shown in FIGS. 3 and 4, the steering sensor 18 comprises shutter wheel 28, attached to a steering column 36. The steering column rotates in unison with the steering wheel as the steering wheel is turned by the driver of the vehicle. Shutter wheel 28 has a plurality of apertures 30, in this case 40 in number, which apertures serve to trigger the activity of detectors A and B as the shutter wheel is rotated with the steering system of the vehicle. Because there are 40 apertures contained within the shutter wheel 28, the steering sensor provides a signal 80 times during one revolution of the steering wheel and, as a result, each of the 80 signals or steps indicates 4.5° of rotation of the steering system. Those skilled in the art will appreciate that to attain greater control accuracy, a shutter having a greater number of apertures could be used. This considerably increases the resolution and correspondingly the precision of the sensor.

Figure 5A:
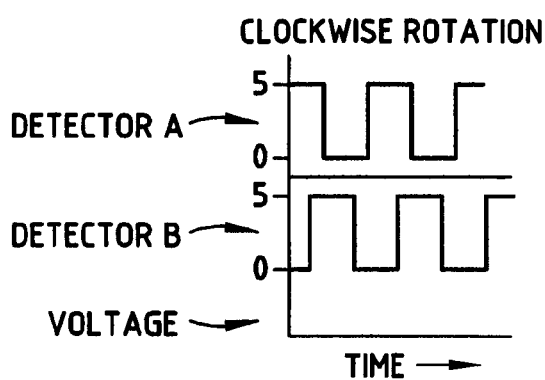
FIG. 5A illustrates the output wave forms of the detectors employed in the steering sensor illustrated in FIGS. 3 and 4 for clockwise rotation.

As shown in FIG. 4, each of the detectors A and B includes a light emitting diode (LED) 32 and a photo diode 34. The combination of the LED and the photo diode is used to detect movement of the shutter wheel 28 and, hence, the steering system. This is possible because the photo diodes have two states, i.e., they are bistable. A conducting state occurs whenever light from the paired LED passes through one of the apertures 30 in the shutter wheel and impinges upon the photo diode. The output of the detector circuit then rises to approximately 5 volts. A non-conducting state exists whenever the shutter wheel blocks the transmission of light between the LED and the photo diode. As shown in FIG. 5A, clockwise rotation of the shutter wheel 28 produces a wave form pattern for the detectors A and B in which detector A undergoes its transition prior to detector B. In other words, detector A leads detector B.

Figure 5B:
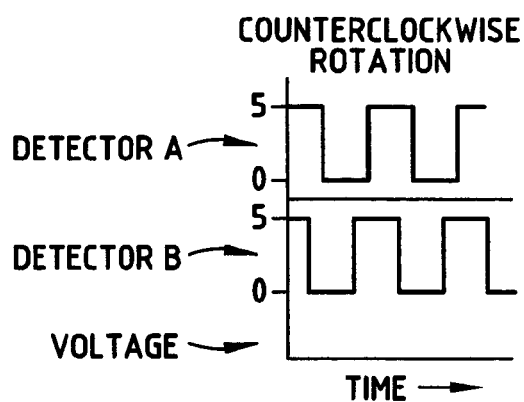
FIG. 5B illustrates the output wave forms of the detectors employed in the steering sensor illustrated in FIGS. 3 and 4 for counterclockwise rotation.

On the other hand, as shown in FIG. 5B, counterclockwise rotation of the steering sensor produces a wave form pattern for the detectors A and B in which detector A undergoes its transition after detector B and detector A thus lags detector B. The outputs of detectors A and B are fed into the control module and in this manner a control module is allowed to track the direction of the steering system's rotation.

Figure 6:
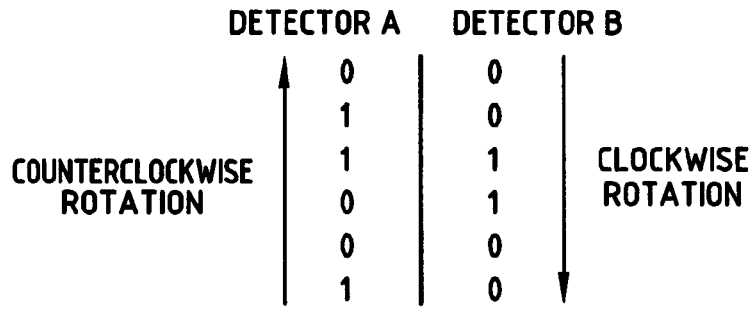
FIG. 6 is a truth table illustrating the outputs of detectors A and B illustrated in FIGS. 3–5 as the steering sensor of the present invention is rotated counterclockwise and clockwise.

FIG. 6 is a tabulation of the wave forms shown in FIGS. 5A and 5B in a digital format. In conventional fashion, the approximately 5 volts maximum output of the detectors A and B is treated as a logical "1," while the zero output state is treated as a logical "0." FIG. 6 shows each of the possible logic pair states which could be output by detectors A and B. The pairs are arranged in the order in which they will be received by the control module for both counterclockwise and clockwise rotation. As seen in FIG. 6, counterclockwise rotation is read from the bottom of the figure to the upper part of the figure, with clockwise rotation being read from the top of the tabulation to the lower part of the tabulation. With the optical sensor herein described, the detectors A and B are preferably running the entire time that the steering lock of the vehicle is not engaged. Alternatively, the error checking is preferably carried out following a beginning of sensing by the detectors A and B, typically after the engine is started. Those skilled in the art will appreciate that other steering angle sensors could be utilized, including, but not limited to, magnetic and geared sensors. It should also be noted that existing steering angle sensors fitted to the vehicle for other purposes (e.g., Dynamic Stability Control) could be used together with controllers and displays described herein.

Figure 7:
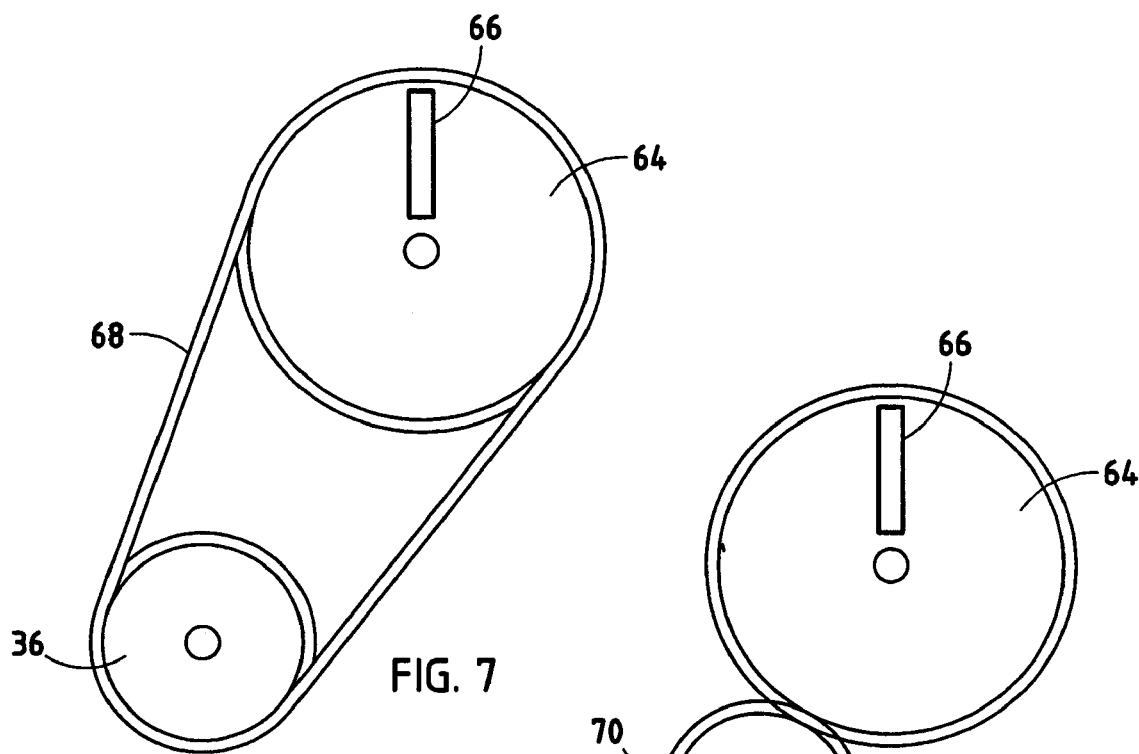
FIG. 7 is a schematic view of a first visual indicator directly connected to a steering column of the vehicle.
Figure 8:
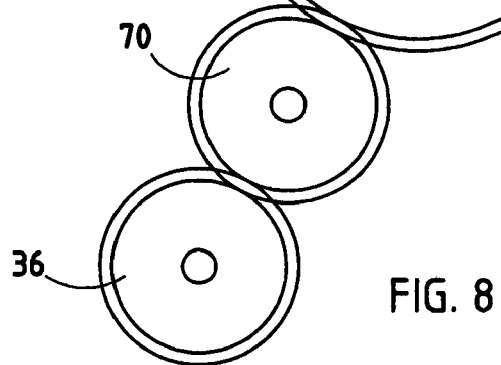
FIG. 8 is a schematic view of a second visual indicator directly connected to a steering column of the vehicle.
Figure 9:
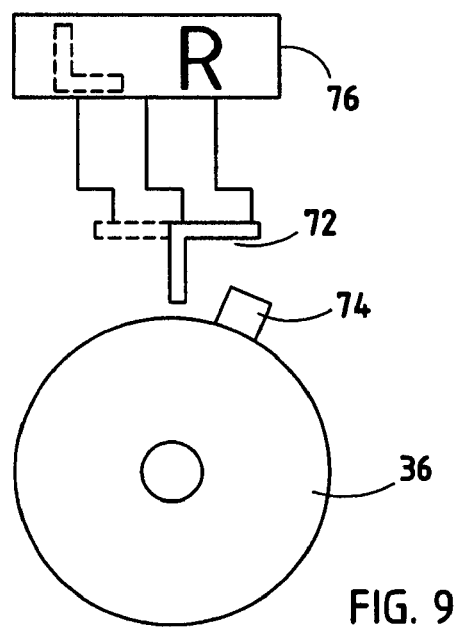
FIG. 9 is a schematic view of a third visual indicator directly connected to a steering column of the vehicle.

FIGS. 7–9 illustrate visual indicators directly connected to the steering column 36 of the vehicle. In each of the visual indicators illustrated in FIGS. 7 and 8, the visual indicator includes a circular display 64 in the dashboard of the vehicle 10 that represents the angle of the steerable wheel 12 via a line 66, wherein the line is vertical, or in the twelve o'clock position. The line 66 will rotate with the steering column 36 to represent the angle of the wheel 12. In the visual indicator in FIG. 7, a drive belt 68 extends between the circular display 64 and the steering column 36 to rotate with the steering column 36. In the visual indicator in FIG. 8, an idler gear 70 is positioned between the steering column 36 and the circular display 64 and rotates the circular display 64 with rotation of the steering column 36. In the visual indicator of FIG. 9, an L-shaped steering direction switch 72 is positioned adjacent the steering column 36 and a protrusion 74 on the steering column 36 alternatively switches the direction switch 72 as the steering column 36, and therefore the steerable wheel 12, moves from a left position (shown in phantom) to a right position (and vice versa). The visual indicator in FIG. 9 is an electronic indicator 76 that displays the left or right position of the steerable wheel 12.

Figure 10:
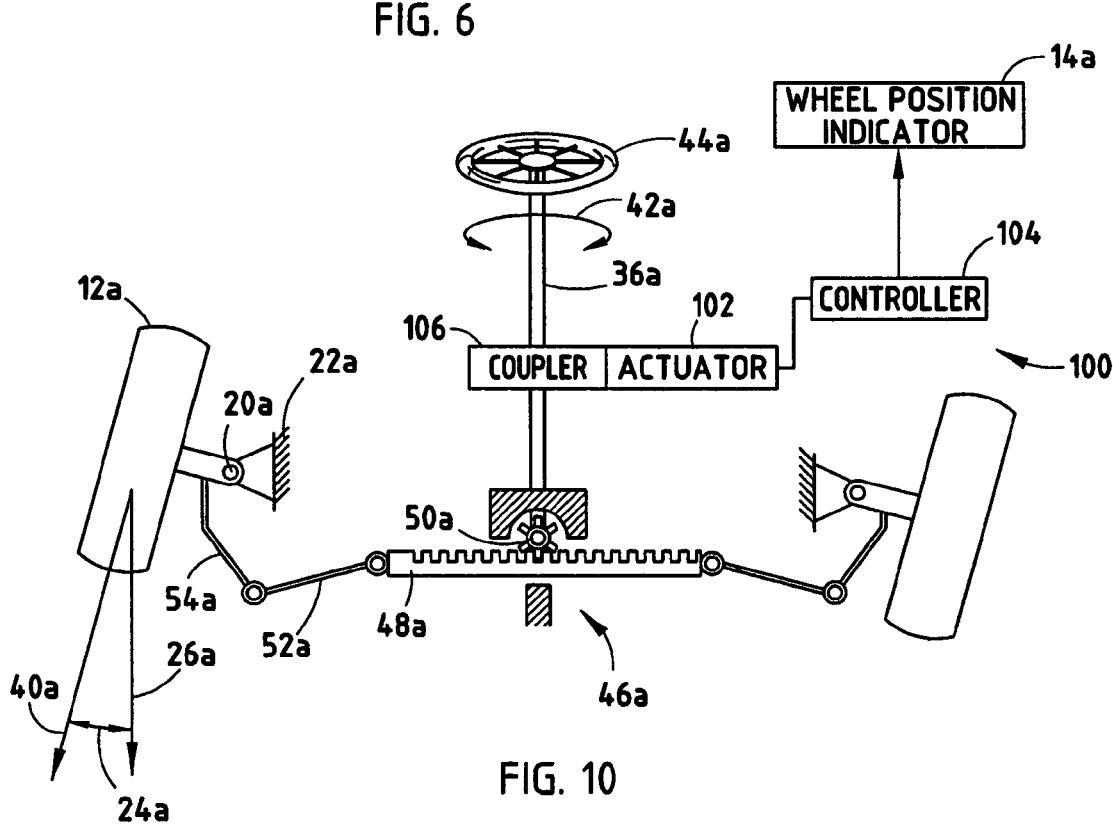
FIG. 10 is a schematic view of a vehicle having active front steering embodying the present invention.

In another method of measuring the steerable wheel position, an active steering system 100 is used in the vehicle 10a. Since the vehicle 10a with the active steering system is similar to the previously described vehicle 10 in FIG. 1, similar parts appearing in FIG. 1 and FIG. 10, respectively, are represented by the same, corresponding reference number, except for the suffix "a" in the numerals of the latter. With the active front steering system 100, the vehicle 10 comprises a powered actuator 102 controlling the steering angle 24a in combination with a driver input control angle measured on the steering wheel 44a. The active front steering system 100 includes an active front steering controller 104 in operable communication with the powered actuator 102. The powered actuator 102 is operably connected to the steering column 36a via a coupler 106. The active front steering system 100 assists in pivoting the steerable wheels 12a. Although a particular kind of active front steering system 100 is described herein, other systems known in the art may be utilized. In basic operation, the active front steering system 100 alters (positively or negatively) the driver input control angle from the driver as applied to the steering wheel 44a, via the powered actuator 102. The steering angle 24a as defined by the steerable wheel 12a is determined by a combination of the driver input control angle and an additional steering angle supplied by the powered actuator 102. The active front steering controller 104 could include the controller 16 (or communicate with the controller 16 (not shown)) to provide the position of the wheel 12a and to switch the wheel position indicator between the on state and the off state. The wheel position as supplied by the wheel position indicator 14a could be a function of the combined steering input (i.e., driver input control angle plus additional steering angle supplied by powered actuator 102) to the vehicle.

In the present invention, when the digital visual indicator is used, the controller 16 selectively alters the wheel position indicator 14 between the on state and the off state by turning the digital visual indicator on and off for the on state and the off state, respectively. Therefore, the lights of the digital visual indicator will represent the position of the steerable wheel when the wheel position indicator is in the on state and will not represent the position of the steerable wheel when the wheel position indicator is in the off state. Alternatively, when an analog visual indicator is used (e.g., when the visual indicator is directly connected to the steering column of the vehicle), a back light of the visual indicator will be turned on when the wheel position indicator is in the on state and will be turned off when the wheel position indicator is in the off state. A back light is a light behind the indicators (e.g., speedometer, odometer, fuel gauge, etc.) that allows the indicators to be seen. When the wheel position indicator is in the off state, the back light behind the visual indicator will be shut off.

In one embodiment of the present invention, the predetermined driving condition is when the vehicle 10 is traveling off of a paved road surface, or in an off road condition. In this embodiment, the controller 16 communicates with a sensor 150 detecting an operating parameter of the vehicle 10 to determine if an off road condition is present based upon the operating parameter. The controller 16 may include a general-purpose microprocessor-based controller, and may include a commercially available off-the-shelf controller. The controller 16 preferably includes a processor and memory for storing and processing software algorithms which processes inputs from the sensor. If the controller 16 determines if an off road condition is present, the controller 16 switches the wheel position indicator to the on state.

The following are examples of operating parameters readable by the sensor 150 and the determination made by the controller 16 to determine that the off road condition is present. First, the sensor 150 could read a steerable wheel to road friction at high temperatures, with a low ratio indicating that the vehicle 10 is in the off road condition. Second, the sensor 150 could read a vertical acceleration of the vehicle 10 in combination with a speed of the vehicle 10, with a large vertical acceleration of the vehicle 10 at low speeds indicating that the vehicle 10 is in the off road condition. Third, the sensor 150 could read a condition of differential locks, with an engagement of the differential locks indicating that the vehicle 10 is in the off road condition. Fourth, the sensor 150 could read a condition of a low ratio gear box, with engagement of the low ratio gear box indicating that the vehicle 10 is in the off road condition. Fifth, the sensor 150 could read a frequency of a load on the steerable wheels 12, with a dynamic low frequency indicating that the vehicle 10 is in the off road condition. Sixth, the sensor 150 could read deflections of an anti-roll bar, with large deflections indicating that the vehicle 10 is in the off road condition. Seventh, the sensor 150 could receive global positioning satellite (GPS) signals, with the GPS signals indicating that the vehicle 10 is in the off road condition. Eighth, the sensor 150 could read a position of a dial in the vehicle 10 selected by the driver, with the position of the dial indicating that the vehicle 10 is in the off road condition. Finally, the sensor 150 could read a difference in a height of the steerable wheels 12, with a height below a certain level indicating an on road condition because the vehicle 10 could only be on a curb, but a number of large wheel travels indicating that the vehicle 10 is in the off road condition. Although only one operating parameter reading can be used to determine the condition of the vehicle 10, more than one operating parameter could be measured by the sensor 150 or multiple sensors to determine the condition of the vehicle 10. The sensors, measurements taken by the sensors and the determinations by the controller 16 listed above are described for illustrative purposes only and are not meant to limit the sensors and sensor readings available in the system of the present invention. The controller 16 would also be able to determine that the off-road condition is not present using the same readings as discussed above. The controller 16 would therefore determine that an on road condition is present.

In another embodiment of the present invention, the predetermined driving condition is when the steerable wheel 12 has a slip angle above or equal to a predetermined amount. The slip angle is the angle between a plane of the wheel (the central plane of the wheel, normal to the spin axis) and the direction of travel of the center of tire contact (the intersection of the wheel plane and vertical projection of the spin axis of the wheel onto the road plane). The slip angle as used in the second embodiment could be set to any desirable slip angle. For example, the predetermined driving condition would be when the slip angle of the steerable wheel is above 5°. In the preceding example, the controller 16 would turn the wheel position indicator 14 to the on state when the wheel slip is at 5° or above and would turn the wheel position indicator 14 to the off state when the wheel slip is below 5°. Those skilled in the art would appreciate that any other slip angle could be used for turning the wheel position indicator 14 between the on state and the off state.

In yet another embodiment of the present invention, the predetermined driving condition is when the steering angle 24 is above a certain amount. For example, the wheel position indicator 14 could be turned to the on state when the steering angle 24 is equal to or above 33° and turned to the off state when the steering angle 24 drops below 33°.

It will be readily appreciated by those skilled in the art that modifications may be made to the invention without departing from the concepts disclosed herein. Such modifications are to be considered as included in the following claims, unless these claims by their language expressly state otherwise.

We claim:

1. A method of indicating a steered position of a steerable wheel of a vehicle comprising:
    providing a wheel position indicator having an on state and an off state, the wheel position indicator providing a visual indication of the steered position of the steerable wheel when the wheel position indicator is in the on state, the wheel position indicator not providing the visual indication of the steered position of the steerable wheel when the wheel position indicator is in the off state;
    placing the wheel position indicator into the on state when the vehicle is in a predetermined driving condition; and
    placing the wheel position indicator into the off state when the vehicle is not in the predetermined driving condition.

2. The method of indicating the steered position of the steerable wheel of the vehicle of claim 1, wherein:
    the predetermined driving condition is an off road driving condition.

3. The method of indicating the steered position of the steerable wheel of the vehicle of claim 1, wherein:
    the predetermined driving condition occurs when the steerable wheel has a slip angle above or equal to a predetermined amount.

4. The method of indicating the steered position of the steerable wheel of the vehicle of claim 1, wherein:
    the visual indication of the steered position of the steerable wheel includes a display mechanically connected to a steering column of the vehicle.

5. The method of indicating the steered position of the steerable wheel of the vehicle of claim 1, further including:
    determining a position of the steering column.

6. The method of indicating the steered position of the steerable wheel of the vehicle of claim 1, wherein:
    the visual indication includes a digital display.

7. The method of indicating the steered position of the steerable wheel of the vehicle of claim 1, wherein:
    the steered position of the steerable wheel includes an angle of the steerable wheel relative to a longitudinal axis of the vehicle.

8. The method of indicating the steered position of the steerable wheel of the vehicle of claim 1, wherein:
    the steered position of the steerable wheel includes a left or a right steered position of the steerable wheel relative to a longitudinal axis of the vehicle.

9. A wheel position indication system for a vehicle, comprising:
    a steerable wheel;
    a wheel position indicator having an on state and an off state, the wheel position indicator providing a visual indication of a steered position of the steerable wheel when the wheel position indicator is in the on state, the wheel position indicator not providing the visual indication of the steered position of the steerable wheel when the wheel position indicator is in the off state;
    a controller selectively altering the wheel position indicator between the on state and the off state;
    wherein the controller places the wheel position indicator into the on state when the vehicle is in an off road condition and places the wheel position indicator into the off state when the vehicle is not in the off road condition.

10. The wheel position indication system for the vehicle of claim 9, wherein:
    the visual indication of the steered position of the steerable wheel includes a display mechanically connected to a steering column of the vehicle.

11. The wheel position indication system for the vehicle of claim 9, further including:
    a shutter wheel having apertures adjacent a periphery of the shutter wheel, the shutter wheel being adapted to be connected to a steering column;
    wherein the controller communicates with sensors reading light emitted through the apertures of the shutter wheel to determine the steered position of the steerable wheel.

12. The wheel position indication system for the vehicle of claim 9, wherein:
    the visual indication includes a digital display.

13. The wheel position indication system for the vehicle of claim 9, wherein:
    the steered position of the steerable wheel includes an angle of the steerable wheel relative to a longitudinal axis of the vehicle.

14. The wheel position indication system for the vehicle of claim 9, wherein:
    the steered position of the steerable wheel includes a left or a right steered position of the steerable wheel relative to a longitudinal axis of the vehicle.

15. A wheel position indication system for a vehicle, comprising:
    a steerable wheel;
    a wheel position indicator having an on state and an off state, the wheel position indicator providing a visual indication of a steered position of the steerable wheel when the wheel position indicator is in the on state, the wheel position indicator not providing the visual indication of the steered position of the steerable wheel when the wheel position indicator is in the off state;
    a controller selectively altering the wheel position indicator between the on state and the off state;
    wherein the controller places the wheel position indicator into the on state when the steerable wheel has a slip angle above or equal to a predetermined amount and places the wheel position indicator into the off state when the steerable wheel has a slip angle below the predetermined amount.

16. The wheel position indication system for the vehicle of claim 15, wherein:
the visual indication of the steered position of the steerable wheel includes a display mechanically connected to a steering column of the vehicle.

17. The wheel position indication system for the vehicle of claim 15, further including:
a shutter wheel having apertures adjacent a periphery of the shutter wheel, the shutter wheel being adapted to be connected to a steering column;
wherein the controller communicates with sensors reading light emitted through the apertures of the shutter wheel to determine the steered position of the steerable wheel.

18. The wheel position indication system for the vehicle of claim 15, wherein:
the visual indication includes a digital display.

19. The wheel position indication system for the vehicle of claim 15, wherein:
the steered position of the steerable wheel includes an angle of the steerable wheel relative to a longitudinal axis of the vehicle.

20. The wheel position indication system for the vehicle of claim 15, wherein:
the steered position of the steerable wheel includes a left or a right steered position of the steerable wheel relative to a longitudinal axis of the vehicle.

21. A method of indicating a steered position of a steerable wheel of a vehicle comprising:
providing a wheel position indicator having a wheel angle indication state and a wheel angle non-indication state, the wheel position indicator providing a visual indication of the steered position of the steerable wheel when the wheel position indicator is in the wheel angle indication state, the wheel position indicator not providing the visual indication of the steered position of the steerable wheel when the wheel position indicator is in the wheel angle non-indication state;
placing the wheel position indicator into the wheel angle indication state in response to a mode being selected by a driver of the vehicle; and
placing the wheel position indicator into the wheel angle non-indication state when the mode is not selected by the driver of the vehicle;
wherein the wheel position indicator is configured to be in either the wheel angle indication state or the wheel angle non-indication state while the vehicle is running.

22. The method of claim 21, wherein:
the mode is a driving condition mode.

23. The method of claim 22, wherein:
the driving condition mode is an off-road driving condition.

24. The method of claim 21, wherein:
the wheel position indicator is able to indicate a plurality of angles of the steerable wheel relative to a longitudinal axis of the vehicle.

25. A wheel position indication system for a vehicle, comprising:
a steerable wheel;
a wheel position indicator having a wheel angle indication state and a wheel angle non-indication state, the wheel position indicator providing a visual indication of a steered position of the steerable wheel when the wheel position indicator is in the wheel angle indication state, the wheel position indicator not providing the visual indication of the steered position of the steerable wheel when the wheel position indicator is in the wheel angle non-indication state; and
a controller selectively altering the wheel position indicator between the wheel angle indication state and the wheel angle non-indication state;
wherein the controller places the wheel position indicator into the wheel angle indication state in response to a mode selected by a driver of the vehicle and places the wheel position indicator into the wheel angle non-indication state when the mode is not selected by the driver of the vehicle; and
wherein the wheel position indicator is configured to be in either the wheel angle indication state or the wheel angle non-indication state while the vehicle is running.

26. The wheel position indication system for a vehicle of claim 25, wherein:
the mode is a driving condition mode.

27. The wheel position indication system for a vehicle of claim 26, wherein:
the driving condition mode is an off-road driving condition.

28. The wheel position indication system for a vehicle of claim 25, wherein:
the wheel position indicator is able to indicate a plurality of angles of the steerable wheel relative to a longitudinal axis of the vehicle.

* * * * *